Oct. 20, 1964   K. WITZANY   3,153,562
RECORDING APPARATUS
Filed July 23, 1962
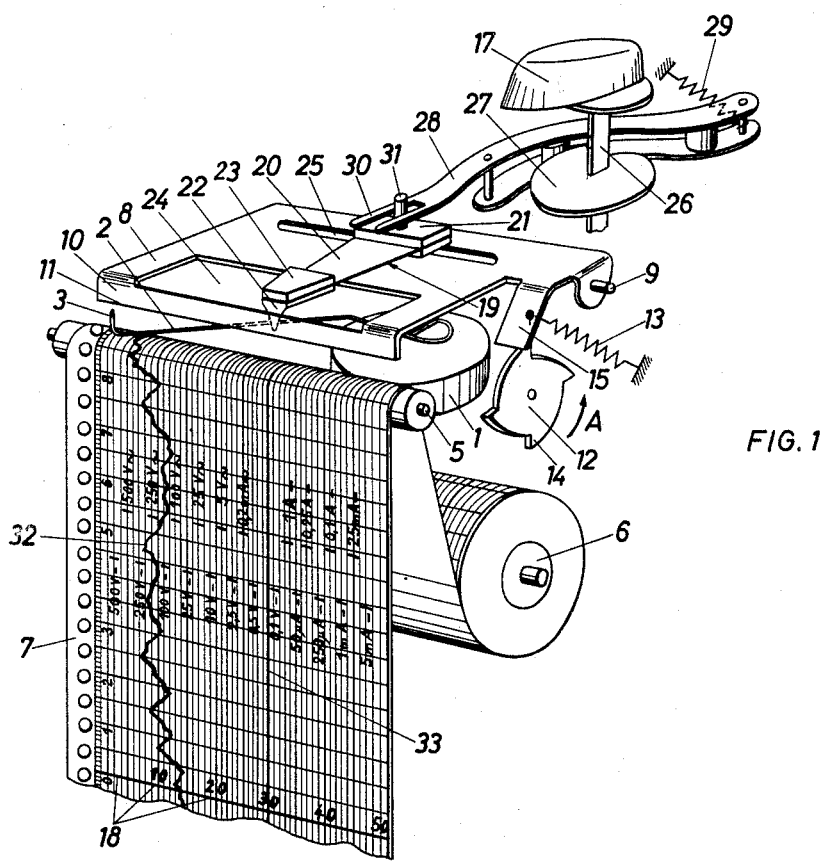
FIG. 1
FIG. 2
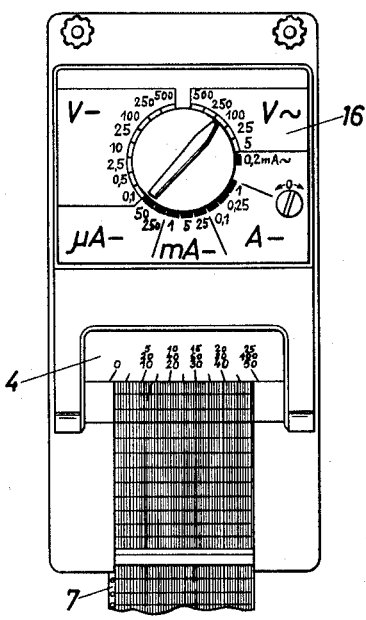
INVENTOR.
KARL WITZANY
BY
ATTORNEYS

3,153,562
RECORDING APPARATUS
Karl Witzany, Vienna, Austria, assignor to C. P. Goerz Electro A.G., Vienna, Austria
Filed July 23, 1962, Ser. No. 211,580
Claims priority, application Austria, July 27, 1961, 5,788/61
3 Claims. (Cl. 346—23)

This invention relates to a recording apparatus comprising a device for recording additional markings on a chart tape, which apparatus when used with a recording instrument comprising a striker enables not only a sensing and recording of measured values but, e.g., a marking of the set measuring range in multiple-range recorders or of tolerance lines for indicating an inadmissible deviation of the measured value beyond their normal tolerance.

It is a feature of the invention that the recording apparatus comprises a measuring system including a measuring system pointer which records the measured values under the influence of a periodically moved striker on a moving tape, said striker having a resilient arm carrying a marking stamp for recording additional values on said tape, and means for adjusting said resilient arm on said striker in dependence on the setting of said measuring system.

Another feature of the invention resides in mounting the resilient arm so that it is displaceable parallel to a sensing edge of the striker and for adjustment is connected by a lever arrangement to a measuring range selector.

Finally, it is a feature of the invention that the resilient arm is provided with a weight which loads the marking stamp.

An illustrative embodiment of the measuring device according to the invention is shown with its essential parts in the drawing. FIG. 1 shows those parts of the recording apparatus which serve for recording the marking in conjunction with a recording chart in a perspective view, and FIG. 2 is a top plan view showing the recording apparatus.

The apparatus shown in the drawing is a combination of a multiple measuring instrument and a dot recorder and enables the indication of measured values of current values and voltages of direct and alternating currents on a scale and at the same time the recording thereof in a close succession of dots as a virtually continuous line on a recording tape.

The measuring system is accommodated in a housing 1 and provided with a pointer 2, the laterally bent end 3 of which moves over a dial 4, which may have a plurality of scales, as shown. The pointer 2 constitutes a stylus and moves over a reversing roller 5, around which a chart tape 7 supplied from a supply roll 6 extends. The chart tape is moved by a synchronous motor or a clockwork by a feed roll, not shown, which withdraws the chart tape from the supply roll 6. To effect the marking, the pointer 2 is provided on its side facing the chart tape with a downwardly facing edge, which produces a dot when striking on an inked ribbon, not shown, which is disposed between said edge and the chart tape 7. This striking of the pointer on the inked ribbon is effected by a sensing member 8 in the form of a striker having an edge portion 10 which is turned down to form a striker bar and the lower edge 11 of which extends transversely to the longitudinal direction of the chart tape and as a sensing edge engages the pointer 2 during a periodical pivotal movement of the striker. For this purpose the striker is pivoted on pins 9 at its end remote from the laterally bent edge portion 10. The periodic up and down movement of the striker 8 is effected by a camwheel 12 in conjunction with a spring 13 engaging the striker. The camwheel 12 has ratchet teeth 14, which are engaged by a lug 15 extending obliquely downwardly from the striker, and is driven in the direction of arrow A by a motor, e.g., the motor which feeds the chart tape. During the rotary movement of the camwheel, that tooth 14 which is in engagement with the lug 15 lifts the striker 8 from the pointer 2. As soon as the tooth 14 has moved past the lug 15, the striker 8 is driven against the pointer 2 under the action of gravity and of the spring 13 so that the pointer 2 strikes the underlying inked ribbon, not shown, and marks a dot on the chart tape 7. This striking action is repeated in rapid succession so that the dots merge to form a line.

By a connection or disconnection of different resistors the apparatus may be used for measuring in different ranges, in which the pointer can move throughout the extent of the scales 4. These measuring ranges are illustrated by way of example on the dial 16 in FIG. 2. They are set as desired by turning a switch handle 17. To indicate on the chart tape in what measuring range the reading has been taken, the measuring ranges of the dial 16 are printed on the tape 7 in periodic intervals, as indicated at 18, and a device which will be described hereinafter records a second, straight marking line, which extends through the printed indication of the selected measuring range. To produce this marking line, a marker 19 is provided, which consists essentially of an arm of resilient material which lies over the striker 8 and is gripped at one end in a slide block 21, whereas it carries at its other end a marking stamp 22 and a loading weight 23.

The marking stamp 22 extends through an opening 24 in the striker 8 adjacent the striking bar 10 and is guided along the sensing edge 11 thereof. For this purpose the slide block 21 is longitudinally slidably mounted in a slot 25 in the striker 8 that is parallel to the sensing edge 11.

The marker 19 is adjusted by means of a camwheel 27 secured to the shaft 26 of the switch handle 17 and through the intermediary of a lever 28 which is urged by a spring 29 against the camwheel 27. The lever 28 has a forked end 30 facing the striker 8 and embracing a pin 31 secured to the slide block 21.

The apparatus according to the invention operates as follows:

The sensing of the measuring system pointer 2 in rapid succession causes the measured values to be recorded as a curve 32 as is usual with dot-type recorders of the type described. During this normally impact-type sensing of the measuring system pointer for recording the measured value, the marking stamp 22 will follow the pivotal movement of the striker 8 owing to the resiliency of the arm 28 but due to inertia will be forced onto the recording paper with a time delay after the pointer 2 to produce a mark which indicates which measuring range is set. This marking line is indicated at 33.

Various modifications in structure are possible within the scope of the invention. For instance, the marker 19 may be manually adjusted to be able to mark tolerance lines on the chart paper. The apparatus may be used for indicating and recording other measured values, such as temperature, pressure, humidity etc., if the measuring system is suitably designed.

The apparatus according to the invention has the advantage that the additional marking dots are almost on the same time level as the dots representing the measured value and recording may be effected with the aid of an inked ribbon as well as on a wax-coated recording paper.

What is claimed is:

1. In a recording instrument including a measuring mechanism that is selectively settable for a plurality of measuring ranges and includes a pointer movable transversely across a constantly driven recording chart, a switch for selectively setting the measuring range of said measuring mechanism, and a striker having a striking edge extending transverse the path of chart movement and mounted for reciprocal movement toward and from the chart path for periodically striking said pointer to drive said pointer toward the recording chart to produce dot marks thereon, the combination of measuring range indicating means including a resilient arm mounted on said striker to reciprocate therewith and for movement transverse the direction of chart movement, means connecting said switch with said arm to change its position in accordance with the set measuring range, and a marking stamp carried by said arm to be moved resiliently upon movement of the striker to periodically impinge the recording chart to provide additional dot marks which indicate the measuring range.

2. In a measuring instrument according to claim 1, said striker having a slideway parallel to said striking edge, said resilient arm having one end mounted on a slide member supported by said slideway and carrying said marking stamp at its other end, said connecting means including a lever mounted at one end on a fixed pivot, means operatively connecting said lever with said slide member, and means including a cam actuated by said switch operatively connecting said switch with said lever.

3. In a measuring instrument according to claim 1, said striker having an opening extending along said striking edge, said marking stamp extending through said opening closely adjacent said striking edge, and a mass loading said arm adjacent the marking stamp and which assists the oscillation of said arm.

References Cited in the file of this patent

UNITED STATES PATENTS

| | | |
|---|---|---|
| 2,269,240 | Andersen | Jan. 6, 1942 |
| 2,678,867 | Rasmussen | May 18, 1954 |
| 2,941,183 | Bischof | June 14, 1960 |

FOREIGN PATENTS

| | | |
|---|---|---|
| 786,533 | Great Britain | Nov. 20, 1957 |